(12) United States Patent
Licamele

(10) Patent No.: US 11,606,937 B2
(45) Date of Patent: Mar. 21, 2023

(54) TURNKEY AQUAPONICS SYSTEM

(71) Applicant: Jason Licamele, Scottsdale, AZ (US)

(72) Inventor: Jason Licamele, Scottsdale, AZ (US)

( * ) Notice: Subject to any disclaimer, the term of this patent is extended or adjusted under 35 U.S.C. 154(b) by 0 days.

(21) Appl. No.: 14/718,545

(22) Filed: May 21, 2015

(65) Prior Publication Data

US 2015/0334996 A1  Nov. 26, 2015

Related U.S. Application Data

(60) Provisional application No. 62/001,184, filed on May 21, 2014.

(51) Int. Cl.
*A01K 63/00* (2017.01)
*A01G 31/02* (2006.01)
*A01K 63/04* (2006.01)

(52) U.S. Cl.
CPC ............ *A01K 63/003* (2013.01); *A01G 31/02* (2013.01); *A01K 63/045* (2013.01); *A01K 63/047* (2013.01)

(58) Field of Classification Search
CPC ................................ A01G 31/00; A01G 31/02
See application file for complete search history.

(56) References Cited

U.S. PATENT DOCUMENTS

| | | | | |
|---|---|---|---|---|
| 3,660,933 A | * | 5/1972 | Wong, Jr. ............... | A01G 31/02 239/428.5 |
| 5,056,260 A | * | 10/1991 | Sutton ..................... | A01G 7/00 47/58.1 R |
| 5,127,366 A | | 7/1992 | Kim | |
| 5,328,049 A | * | 7/1994 | Ritzow ................ | A01K 63/003 119/481 |
| 5,983,564 A | | 11/1999 | Stragnola | |
| 8,516,742 B1 | * | 8/2013 | Azoulay ................ | A01G 27/02 47/62 A |
| 2004/0237397 A1 | * | 12/2004 | Zintz ...................... | A01G 27/04 47/66.6 |
| 2011/0131880 A1 | | 9/2011 | Kloas et al. | |
| 2013/0047508 A1 | | 2/2013 | Toone et al. | |
| 2013/0160363 A1 | | 6/2013 | Whitney et al. | |

(Continued)

FOREIGN PATENT DOCUMENTS

| | | | |
|---|---|---|---|
| JP | WO 2015155915 A1 * | 10/2015 | .............. A01G 7/00 |
| KR | 200328757 Y1 * | 10/2003 | |
| NL | 008902482 A * | 5/1991 | |

OTHER PUBLICATIONS

Licamele, Jason, A Turnkey Aquaponics System, Patent Cooperation Treaty Application Serial No. PCT/US16/33702, filed May 21, 2015, International Search Report and Written Opinion dated Aug. 22, 2016.

*Primary Examiner* — Magdalena Topolski
(74) *Attorney, Agent, or Firm* — Schmeiser, Olsen & Watts LLP

(57) ABSTRACT

A home aquaponics grow bed having a hydroponic growing bed with a removable filter component, a depression in the hydroponic growing bed, a removable lid that houses plant and/or plants, and a port and/or hole for allowing water to flow out of the invention and into the fish tank. The grow bed attaches to standard fish tank aquariums converting the fish tank aquariums into a home aquaponics gardening kit. The grow bed enables a user to grow fresh aquaponics herbs, microgreens, medicinal plants, and vegetables in their home using a freshwater aquarium.

7 Claims, 12 Drawing Sheets

(56) References Cited

U.S. PATENT DOCUMENTS

| | | | |
|---|---|---|---|
| 2014/0223818 A1 | 8/2014 | Coghlan | |
| 2014/0223819 A1* | 8/2014 | Coghlan | A01K 63/045 47/62 R |
| 2015/0289463 A1* | 10/2015 | Moriarty | A01G 31/02 47/62 R |
| 2016/0366843 A1* | 12/2016 | Evans | A01G 27/003 |

* cited by examiner

TURNKEY AQUAPONICS SYSTEM

CROSS REFERENCE TO RELATED APPLICATIONS

This application claims priority to U.S. Provisional patent application to Licamele entitled "A TURNKEY AQUAPONICS SYSTEM," Ser. No. 62/001,184, filed May 21, 2015, the disclosure of which is hereby incorporated entirely herein by reference.

BACKGROUND OF THE INVENTION

Technical Field

This invention relates generally to aquaponics systems and more particularly to a turnkey aquaponics system.

State of the Art

The supply of fresh culinary and medicinal plants is limited to people in different geographic regions depending on the time of year or season, and the proximity to the access of the sale of the culinary and medicinal plants. Agriculture is limited in what plants can be grown during certain times of the year and does not provide access to the vast variety of culinary plants. Controlled environment agriculture, greenhouse hydroponics, and aquaponics allow for production of culinary and medicinal plants regardless of geography and time of year. Hydroponic farming methods can require technical skills and are not easily understood by someone who is not skilled in the art.

Accordingly, there is a need for an improved aquaponics system easy for anyone to use.

SUMMARY OF INVENTION

The invention incorporates the design of; an aquaponics growing bed and tray designed to support a given amount of plant biomass, a filter to process the effluent generated from the fish tank, and a pump, venturi pump, and/or aerator or any combination thereof. The present invention is designed so that someone not skilled in the art may produce fresh herbs, vegetables, medicinal plants and/or various hydroponic and/or aquatic plants in their own home. The present invention is a turnkey aquaponics gardening unit that houses fish and/or aquatic animals in conjunction with hydroponic crops. The invention is directed to supply fresh culinary and medicinal herbs, and/or plants, to the operator while simultaneously providing an ornamental aquarium environment. The invention enables someone not skilled in the art of hydroponics and/or aquariums to grow fresh culinary herbs, vegetables, medicinal plants, and/or various hydroponic and/or aquatic plants themselves in their own home.

The present invention is a turnkey home Aquaponics grow bed comprising of a hydroponic growing bed with a removable filter component, a depression in the hydroponic growing bed, a removable lid that houses plant and/or plants, and a port and/or hole for allowing water to flow out of the invention and into the fish tank. The present invention (FIG. 1) attaches to standard fish tank aquariums converting the fish tank aquariums into a home aquaponics gardening kit. The present invention enables a user not skilled in the art to grow fresh aquaponics herbs, microgreens, medicinal plants, and vegetables in their home using a freshwater aquarium. The present invention is designed to enable the operator to grow fish and plants to the specifications of the unit.

The present invention, a turnkey home Aquaponics aquarium unit (FIG. 2), is comprised of; a fish tank, a pump and/or venturi pump, a tube or pipe directing the effluent discharge of the pump into a mechanical and biological filter located inside the hydroponic bed, which water then flows out the bottom and into the hydroponic bed situated on top of the fish tank. The water is circulated via a pump and/or venturi pump from the fish tank through the tubing and the filter, then into the hydroponic bed. The water returns via gravity through a spillway and/or hole back to the fish tank. The invention incorporates the design of a hydroponic bed, with an internal removable filter, and tray cover designed to support a plant and/or plants.

The removable lid for housing plant and/or plants described in the present invention (FIG. 3) is comprised of five holes for holding net pots for growing plants. In this embodiment described in FIG. 3 the hydroponic tray cover is one solid piece fitting into the hydroponic tray. The water returns via gravity through a spillway back to the fish tank. The removable cover described herein may be comprised of one solid piece, two pieces and/or three pieces. The tray may support holes for net pots and/or tray and/or trays for growing plants and holding media The tray may be comprised of one solid piece as described in FIG. 3, or may be comprised of two pieces and/or three pieces as described in FIG. 4. The invention described herein can be constructed to fit any variety of aquarium tanks currently on the market and/or for custom aquarium tanks. The present invention comprises a variety of removable tray covers for growing a variety of and number of plants to fit the aquaponics growing bed.

The plants are fertilized with the processed fish effluent generated in the fish tank and processed by the filter. The amount of fish and fish feed added to the tank are scaled to provide the necessary amount of nutrients to the plants in the hydroponic bed. The filter is sized to support the nitrogenous loading in the system from the fish feed to provide the necessary levels of elements to maintain healthy fish and plants. The flow rates, water circulation patterns, and oxygen provided via the pump, venturi pump, and/or aerator or any combination thereof, and from the spillway in the hydroponic bed, are designed to reduce settling of solids in the system, provide oxygen to the fish and plants, and support the biological processes in the filtration unit. The covers for the plant growing bed are designed to support a given biomass of plants based off of the biomass and feeding rate of fish in the tank.

DETAILED DESCRIPTION OF EMBODIMENTS OF THE INVENTION

Figure 1:
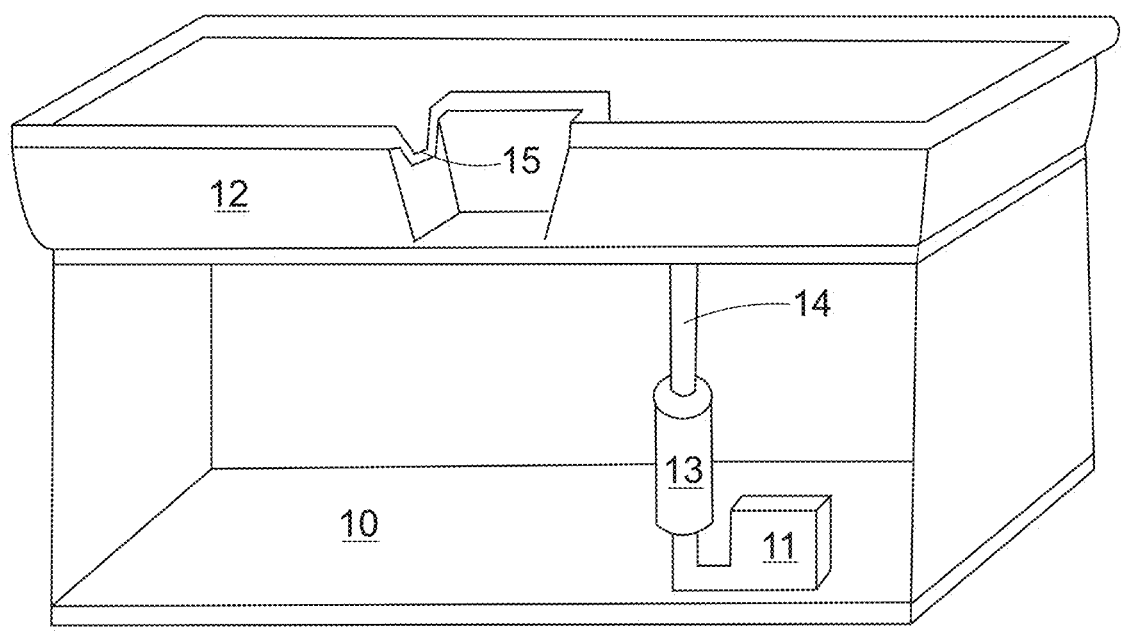
FIG. 1 is a hydroponics growing bed on top of a fish aquarium containing a pump and filter.

The system refers to the invention in its entirety and is referred to as "system" and/or "aquaponics growing bed" when describing the physical and/or operational mechanisms of the present invention.

A fish tank in this embodiment refers to an aquarium fish tank currently used in the art that houses fish, or fish and/or aquatic plants, microalgae, macroalgae, amphibians (frogs), crustaceans (shrimp), molluscs (snails), substrate (rocks, decorations, live rock or any other component in an ornamental aquarium), a bottom scape (sand, pebbles or any other component in an ornamental aquarium), and/or any combination thereof.

A pump in this embodiment refers to a mechanism to move water in a directional pattern. The pump may comprise a pumping mechanism to move water, a pumping mechanism to move water and air simultaneously via a Venturi, and/or an aerator to provide oxygen and/or move water, or any combination thereof. The pump may be powered by electrical energy and/or solar energy, wind energy, hydro energy, or any other method of generating energy.

A filter in this embodiment refers to filter box that houses a mechanical filter media that resides on top of biological filter media, and has holes or slits on the bottom to allow water to pass through. The filter is sized with the appropriate cubic volume of biological media (selected with the appropriate surface area) to support the conversion of nitrogenous waste produced by the fish in the system.

The tube in this embodiment refers to the material that connects the pump to hydroponic bed, and the hydroponic bed to the filter. The tube is sized to support the required flow rate of the system. The tube in this embodiment also incorporates the bulkhead connection to the hydroponic bed and the attachment tube that serves as a standpipe in the hydroponic bed. The location spillway in the hydroponic bed is strategically located on the opposite end to where the standpipe and filter box is located.

The plant growing bed in this embodiment refers to the container that holds the filtered water, houses the filter box, and the cover that holds the growing media and the plants. The hydroponic bed may be composed of acrylonitrile butadiene styrene (ABS), high-density polyethylene (HDPE), polyvinyl chloride (PVC), polycarbonate, glass or any other material suitable and commonly utilized in the aquaculture, aquarium and/or hydroponic industries.

The spillway in this embodiment refers to the area strategically located in the hydroponic bed where the water overflows into the fish tank. In other embodiments this spillway may be a hole, weir, dam, baffle in a tank or any other type of physical material directing water that is strategically formed to allow passage of water.

The covers in this embodiment refer to the covers that provide growing space for the plants. The growing space is comprised of holes to house net pots and/or trays. The net pots and the trays are removable for easy harvesting of the plants and cleaning of the materials. The covers may be one solid piece with a fixed number of holes to support circular and/or rectangular containers to hold the hydroponic media. The covers may be one solid piece, two and/or three separate interchangeable pieces to allow a variety of hydroponic growing containers to be utilized with the same system.

FIG. 1. The present invention is comprised of an Aquaponics growing bed (12) designed to attach to aquarium fish tanks (10). A pump (11) moves water from the fish tank (10) into the aquaponics growing bed (12). The invention (12) is comprised of a hydroponic growing bed with a removable filter box, a tube and/or pipe for directing water from the pump (11) to the filter box, a depression in the hydroponics tray, a removable lid that houses plants and/or plants, and a port for water to flow from the invention (12) back into the fish tank (10).

Figure 2:
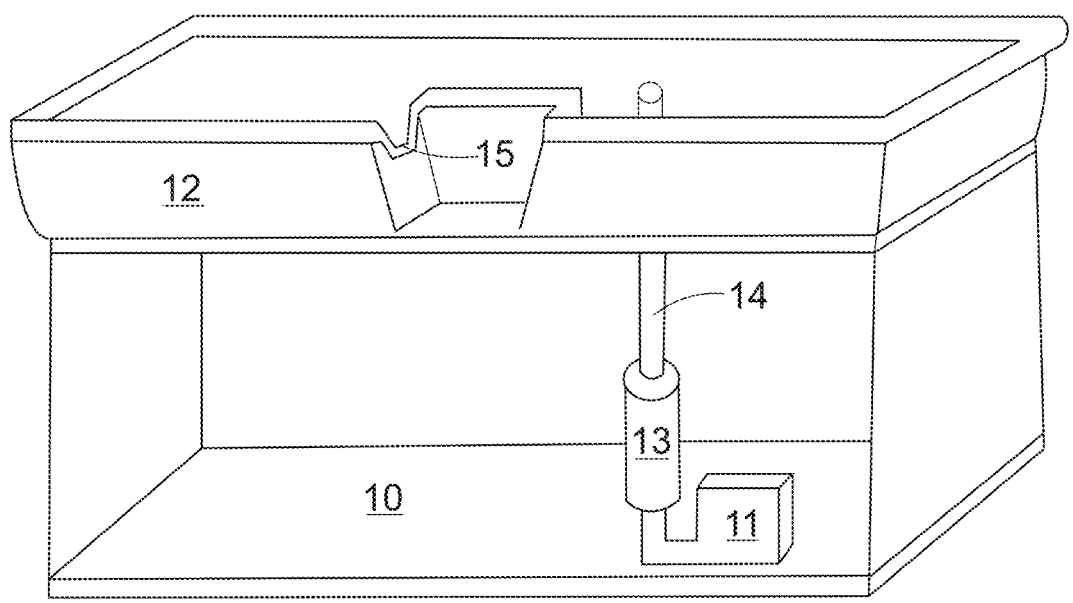
FIG. 2 is a hydroponics growing bed on top of a fish aquarium with a filter extending from the fish aquarium into the hydroponics growing bed.

FIG. 2. The present invention, a turnkey home Aquaponics aquarium unit, is comprised of; (10) a fish tank, (11) a pump and/or venturi pump, (14) a tube or pipe directing the effluent discharge of the pump (11) into a mechanical and biological filter (13) located inside the hydroponic bed, which water then flows out the bottom and into the hydroponic bed (12) situated on top of the fish tank (10). The water is circulated via a pump and/or venturi pump (11) from the fish tank (10) through the tubing (14) and the filter (13), then into the hydroponic bed (12). The water returns via gravity through a spillway (15) back to the fish tank (10). A removable lid housing plant and/or plants fits onto the aquaponics growing bed.

Figure 3:
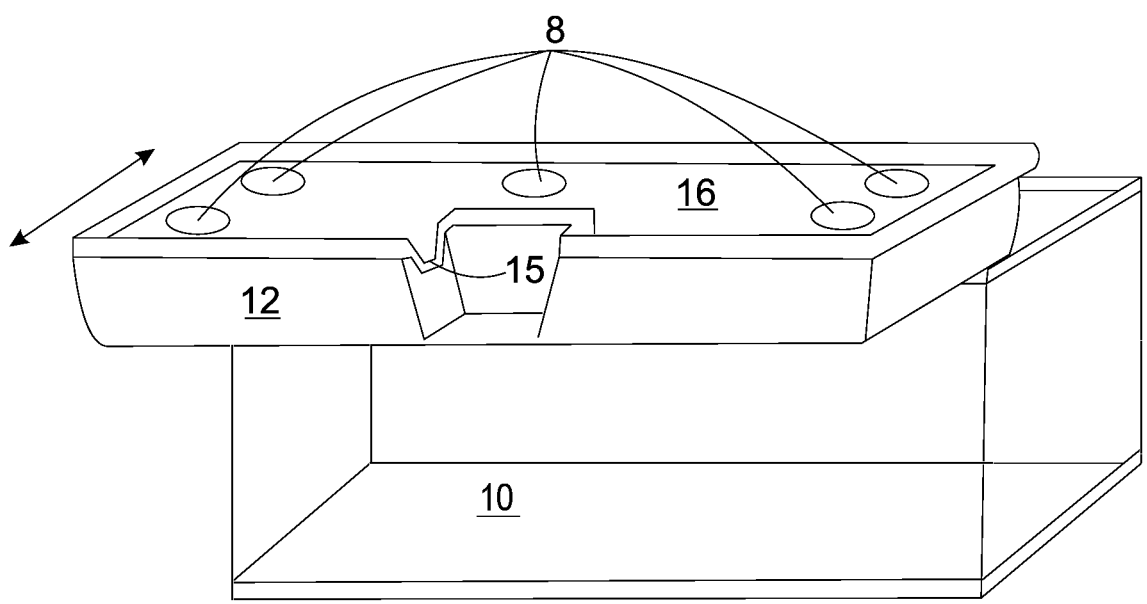
FIG. 3 is a hydroponics growing bed with a removable cover on top of a fish aquarium.
Figure 4A:
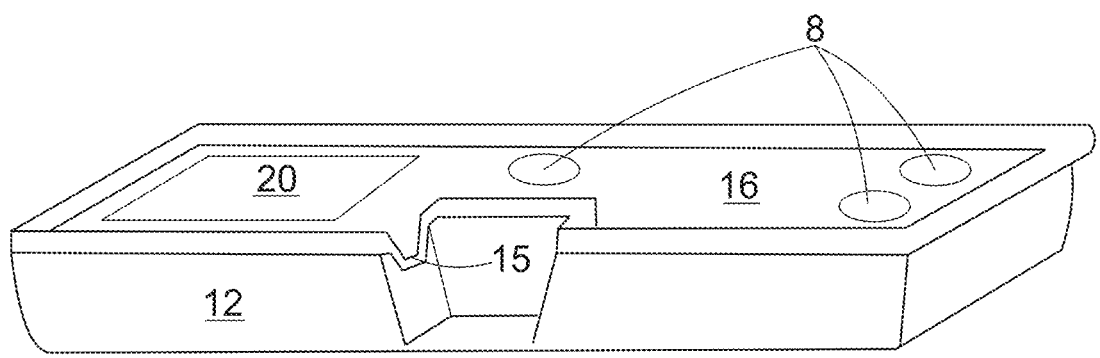
FIG. 4a is a removable cover for a hydroponics growing tray.
Figure 4B:
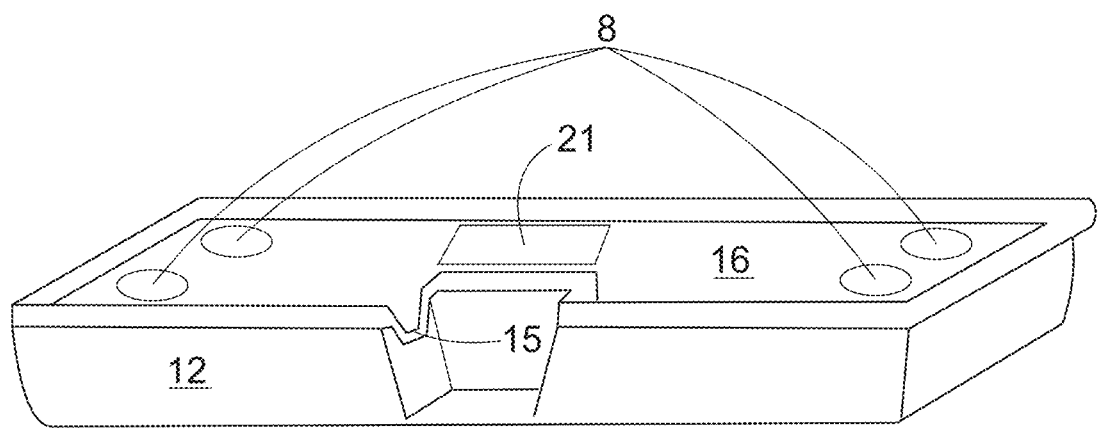
FIG. 4b is a removable cover for a hydroponics growing tray.
Figure 4C:
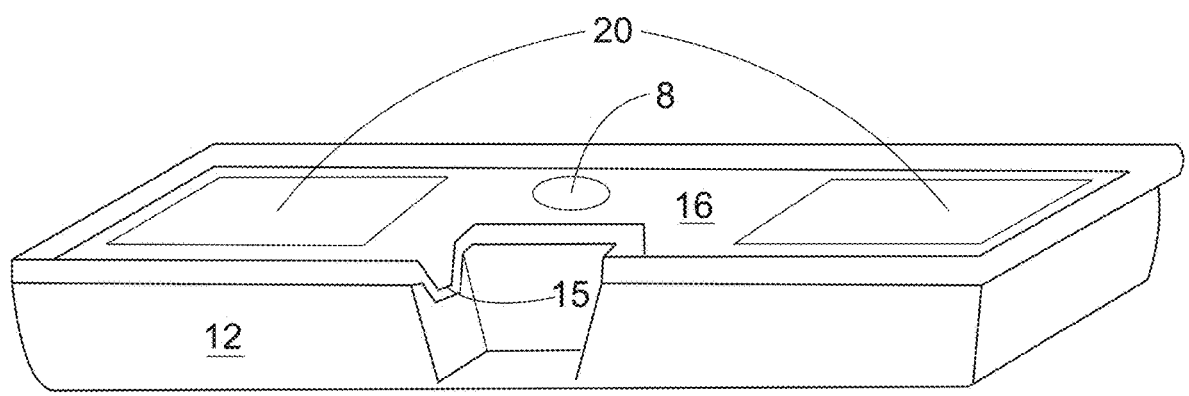
FIG. 4c is a removable cover for a hydroponics growing tray.
Figure 4D:
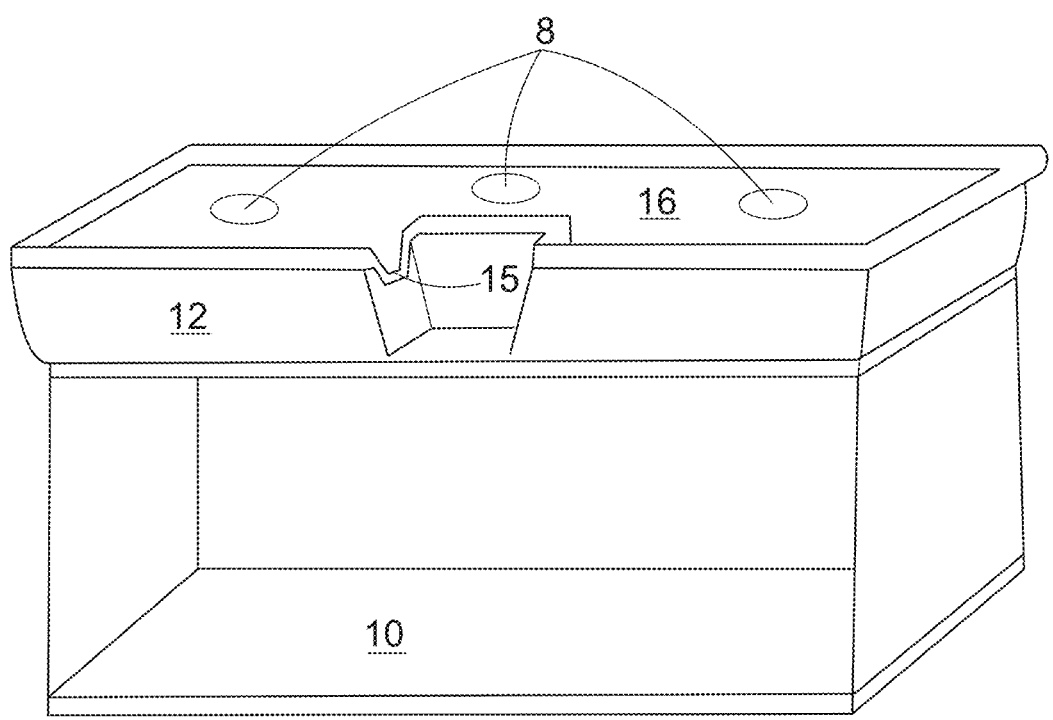
FIG. 4d is a removable cover for a hydroponics growing tray.

FIG. 3. In this embodiment the present invention is comprised of a fish tank (10), a hydroponic tray (12) with a removable cover (16). The removable cover (16) may be comprised of one solid piece, two pieces and/or three pieces. In this embodiment the hydroponic tray cover (16) is one solid piece fitting into the hydroponic tray (12) providing space for growing five plants. The water returns via gravity through a spillway (15) back to the fish tank (10).

FIG. 4. In this embodiment the present invention is comprised of a fish tank, a hydroponic tray, and a variety of different removable cover and/or covers. In one embodiment the cover (16) is comprised of three plant growing spots (8) and a large tray (20). In one embodiment the cover (16) is one solid piece. In one embodiment the cover (16) is two and/or three separate pieces. In one embodiment the cover (16) is comprised of four plant-growing spaces (8) and one small tray (21). In one embodiment the cover (16) is one solid piece. In one embodiment the cover (16) is two and/or three separate pieces. In one embodiment the cover (16) is comprised of one plant growing space (8) and two large trays (20). In one embodiment the cover (16) is one solid piece. In one embodiment the cover (16) is two and/or three separate pieces. In one embodiment the cover (16) is comprised of two larger plant-growing spaces (8) and/or a small plant growing space (8) or tray (21). In one embodiment the cover (16) is one solid piece. In one embodiment the cover (16) is two and/or three separate pieces.

Figure 5A:
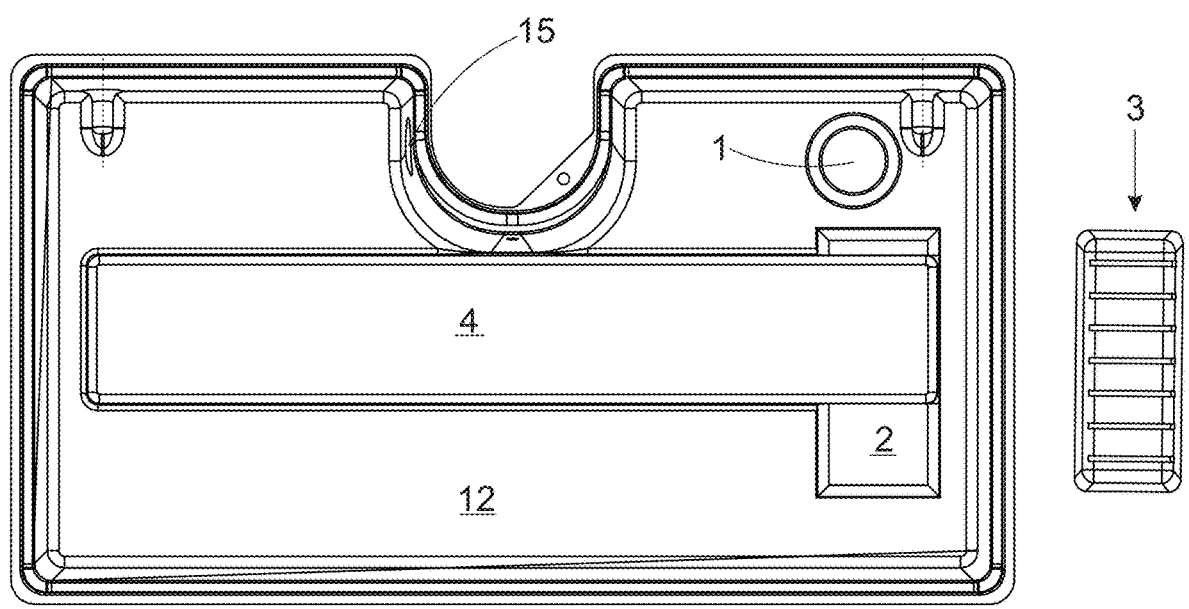
FIG. 5a is a bottom elevation view of a hydroponics growing tray.
Figure 5B:
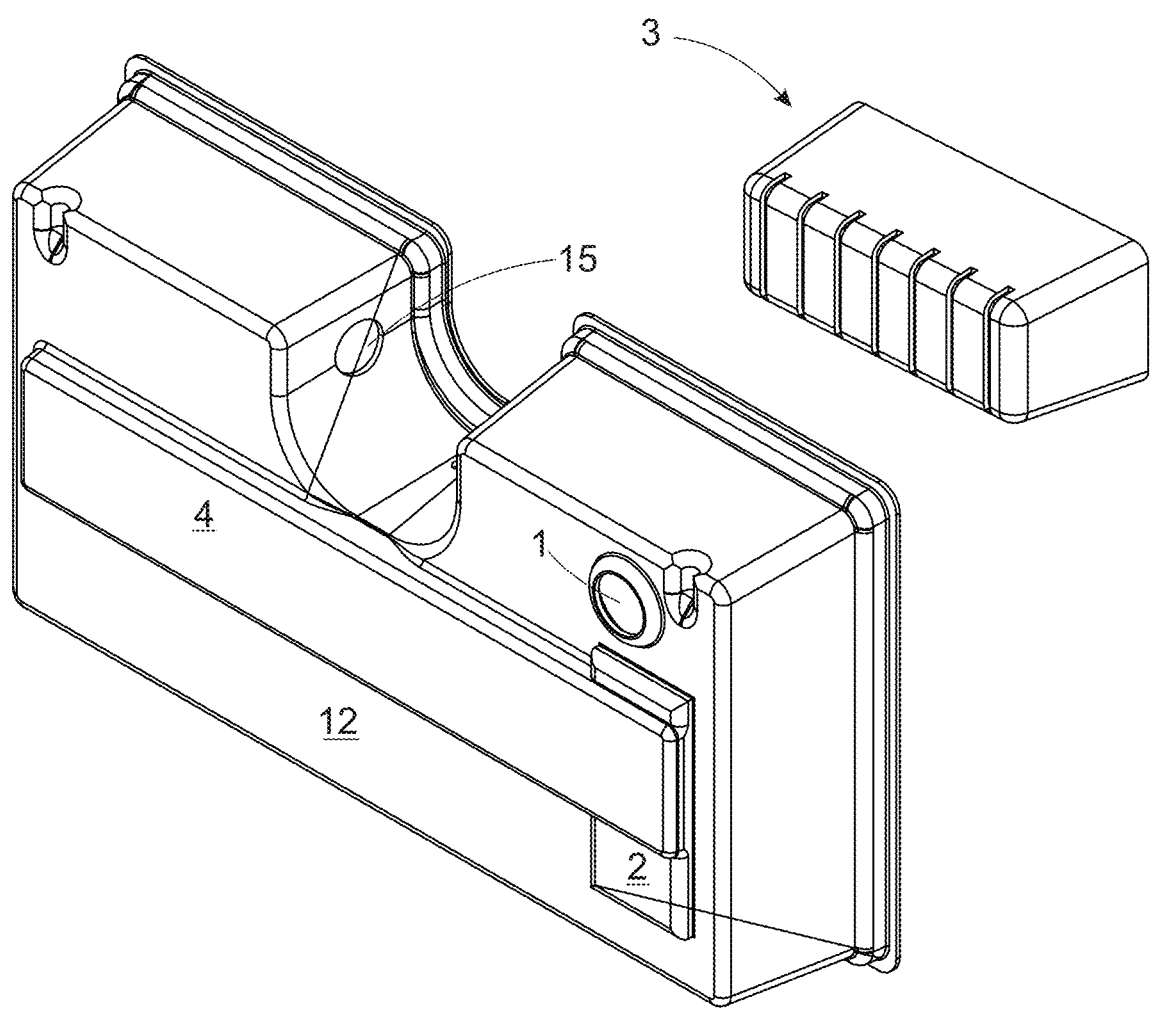
FIG. 5b is a bottom right perspective view of a hydroponics growing tray.

FIG. 5. In one embodiment of the present invention, the Aquaponics growing bed is designed to fit a 10-gallon aquarium. A view of the top and sides, and bottom of the aquaponics growing bed (12) and filter described in this invention show the detailed components of the present invention. Note the port for the tube (1), the depression to place the filter (2), the removable filter (3), the depression in the growing bed (4), the spillway (15), and the depressions for running the airline tubing and/or the electrical plug for the pump and/or underwater LEDs.

Figure 6A:
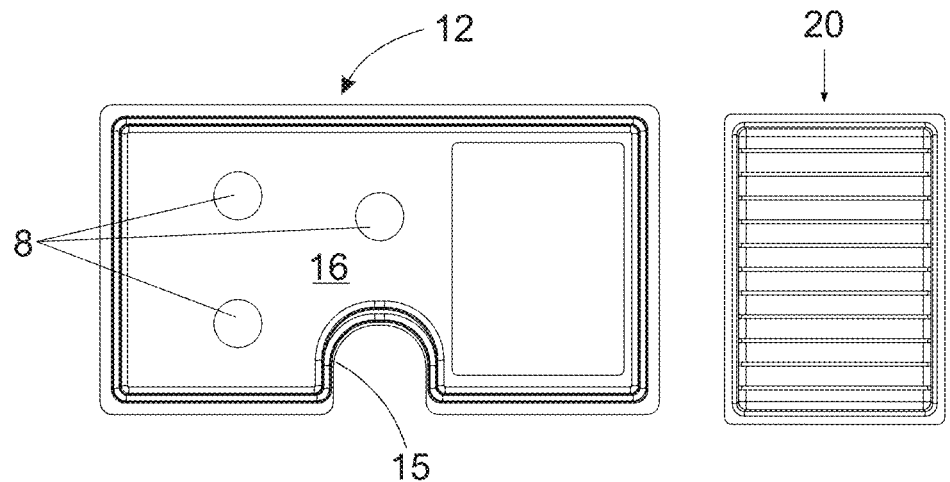
FIG. 6*a* is a top elevation view of a hydroponics growing tray.
Figure 6B:
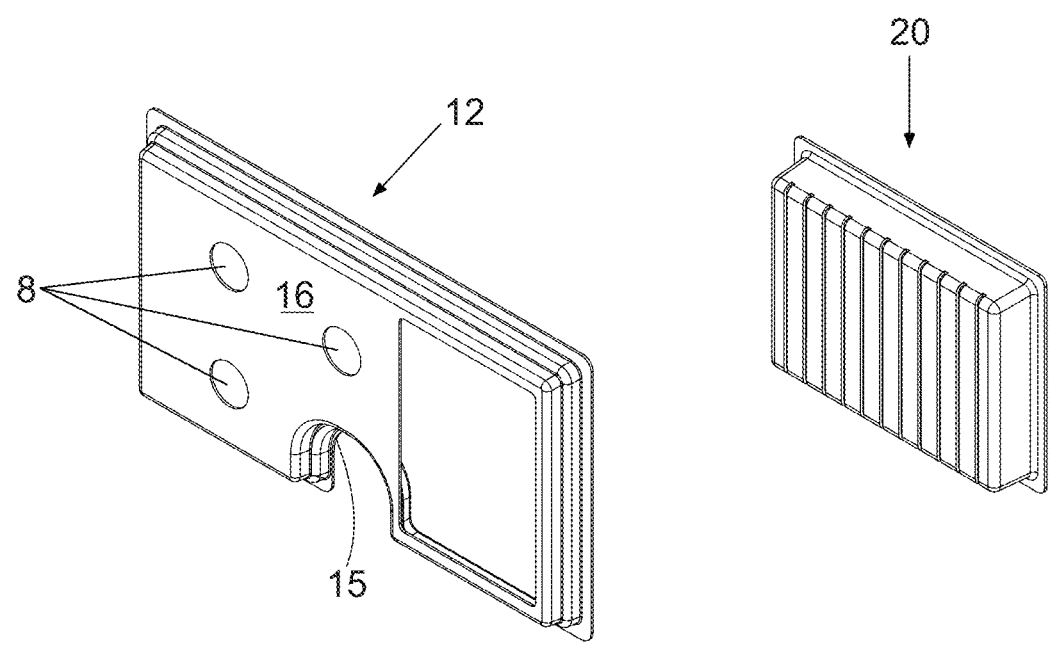
FIG. 6*b* is a bottom right perspective view of a hydroponics growing tray.

FIG. 6. In one embodiment of the present invention, the Aquaponics growing bed (12) is comprised of a cover (16). A drawing of the top and sides, and bottom of the removable cover, note the planting area consists of holes (8) for net pots and a tray (20). In this embodiment the cover is comprised of one solid piece that has planting holes (8) for three plants, and a removable tray that sits inside the cover (16). The cover (16), the net pots that fit into the planting holes (8), and the tray (20) can all be removed individually to allow for easy harvesting plants of the plants and cleaning of the system.

Figure 7:
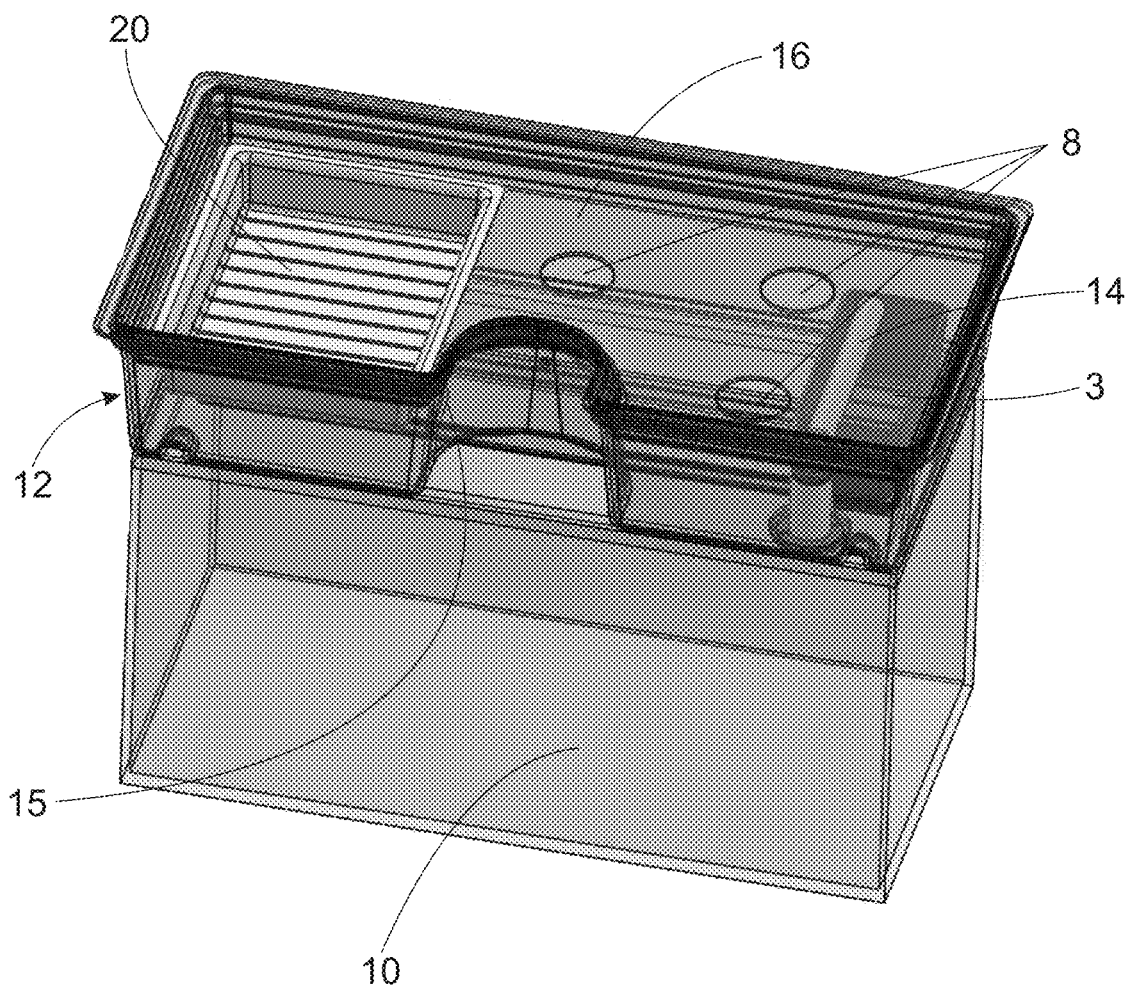
FIG. 7 is a perspective view of a turnkey aquaponics system.

FIG. 7. In one embodiment the invention rests on top of a 10-gallon fish tank, the filter box is located in the plant growing bed (12) and under the cover (16), there are three hole spaces (8) for plants, and there is a removable rectangular tray (20) that supports the growth of plants and/or plants together in one substrate media.

Figure 8:
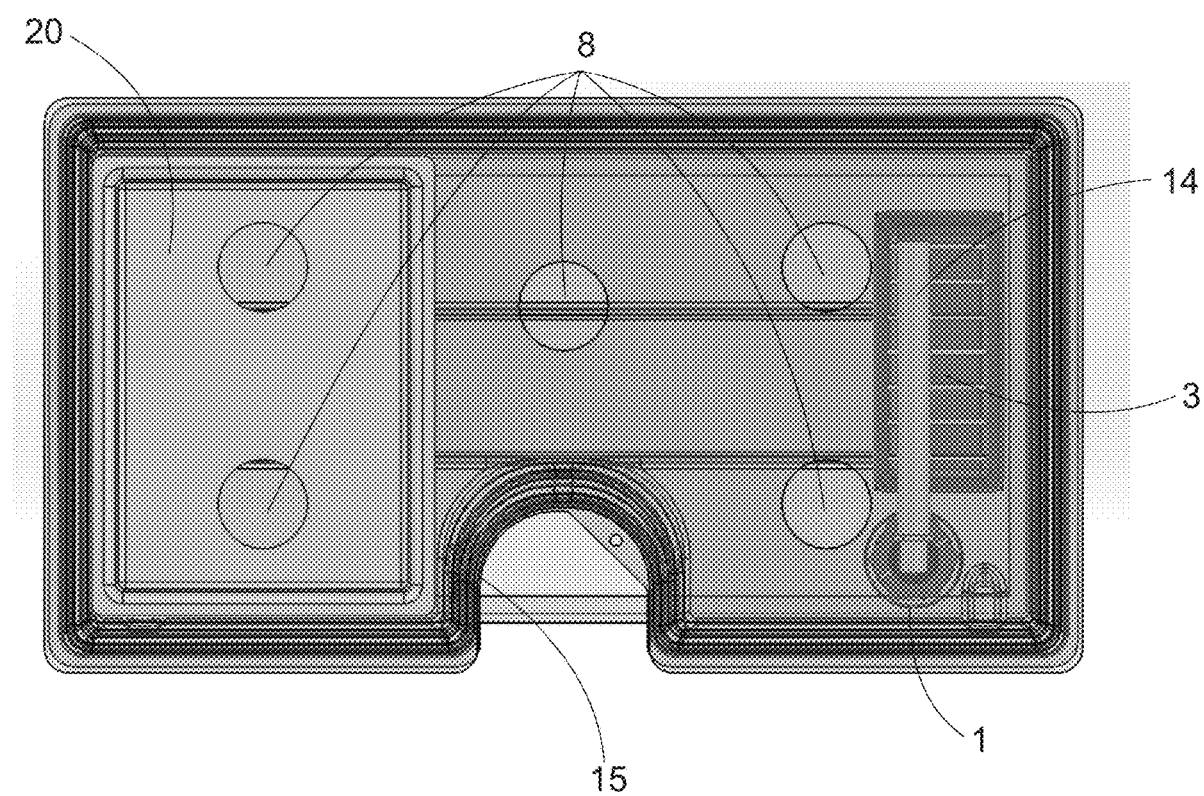
FIG. 8 is a top view of a turnkey aquaponics system.

FIG. 8. In one embodiment the invention rests on top of a 10-gallon fish tank, the filter box is located in the plant growing bed and under the cover, there are three hole spaces (8) for plants, and there is a removable rectangular tray (20) that supports two additional plant holes spaces (8). Note the rectangular tray (20) can be removed from the cover.

In one embodiment the invention described herein, a turnkey aquaponics aquarium system, is comprised of:
a. A container to hold a fluid comprised of:
  i. a standard aquarium tank common in the industry of a size to hold a particular amount of water volume including but not limited to:
    1. one gallon
    2. two gallons
    3. TEN gallon
    4. 20 gallon
    5. 25 gallon
    6. 50 gallons
    7. 90 gallons
    8. 100 gallons
    9. 500 gallons
    10. 1,000 gallons
    11. 5,000 gallons
    12. 10,000 gallons
    13. greater than 10,000 gallons
    14. and/or any volume within the ranges described above
    15. and/or any combination thereof
  ii. a custom designed aquarium tank in the shape of:
    1. a rectangle
    2. a circle
    3. a triangle
    4. an octagon
    5. an oval
    6. a cylinder
    7. a sphere
    8. a pentagon
    9. and/or any combination thereof
  iii. a custom designed aquarium tank in the shape described above of a size to hold a particular amount of water volume including but not limited to:
    1. one gallon
    2. two gallons
    3. ten gallons
    4. 20 gallons
    5. 25 gallons
    6. 30 gallons
    7. 50 gallons
    8. 90 gallons
    9. 100 gallons
    10. 500 gallons
    11. 1,000 gallons
    12. 5,000 gallons
    13. 10,000 gallons
    14. and/or any volume commonly used in the art of the aquarium industry
  iv. any type of container holding water that supports aquatic animals commonly used in the aquarium and/or gardening industries
  v. any type of container holding water that supports soil and/or hydroponic plant production
  vi. and/or any combination of configurations and/or volumes described above
b. a method of moving fluid comprised of a:
  i. a water pump
  ii. a venturi pump
  iii. an aerator
  iv. and/or any combination thereof
c. a filter box comprising space for housing mechanical filter media residing on top of biological filter media for removing solids and converting the nitrogenous wastes in the water excreted by the fish into nitrate
  i. wherein the filter box fits into a depression inside the plant growing bed
  ii. wherein the filter box has slits and/or holes on the bottom to allow water to pass through into the plant growing bed
  iii. wherein the mechanical media is placed on top of the biological media
  iv. wherein the mechanical media is removed periodically and/or washed
  v. wherein the mechanical filter media comprises:
    1. a sponge
    2. filtration floss
    3. mesh netting
    4. plastic shavings and/or plastic beads
    5. carbon
    6. zeolite
    7. Earthstone
    8. Coco coir matting and/or fibers
    9. crushed shells
    10. crushed limestone
    11. rocks and/or pebbles
    12. and/or any combination thereof
  vi. wherein the biological media is comprised of:
    1. a sponge
    2. plastic shavings and/or beads
    3. filtration floss
    4. mesh netting
    5. Bio-Balls
    6. zeolite
    7. Earthstone
    8. crushed shells
    9. crushed limestone
    10. rocks and/or pebbles
    11. and/or any material providing surface area for nitrifying bacteria that does not harm the fish and/or plants and/or is commonly practiced in the art
    12. and/or any combination thereof
d. tubing for directing water flow from the tank to the filter:
  i. wherein the tubing is comprised of:
    1. Tygon
    2. Acrylonitrile butadiene styrene
    3. polyvinyl chloride
    4. polyethylene
    5. high density polyethylene
    6. glass
    7. polycarbonate 8. and/or any other material commonly used as tubing practiced in the art
9. and/or any combination thereof
e. a plant growing bed for holding the filter box, the filtered water form the fish tank, and the hydroponic covers
  i. wherein the plant growing bed fits into the aquarium and rests on the edge of the aquarium
  ii. wherein the plant growing bed slides forward to allow access to the aquarium
  iii. wherein the plant growing bed has a depression in the central portion to prevent the plant growing bed from tipping off the fish aquarium
  iv. wherein the plant growing bed has a spillway to allow water to flow back into the fish tank
  v. wherein the plant growing bed is comprised of:
    1. acrylonitrile butadiene styrene
    2. high density polyethylene
    3. low density polyethylene
    4. polyvinyl chloride
    5. glass
    6. acrylic
    7. polycarbonate
    8. and/or any other material commonly used as tubing practiced in the art
    9. and/or any combination thereof
f. a removable cover and/or covers for supporting various hydroponic plant growth media
  i. wherein the cover is comprised of one solid piece
  ii. wherein the covers are comprised on two pieces
  iii. wherein the covers are comprised of three pieces
  iv. wherein the cover and/or covers are interchangeable with the plant growing bed
  v. wherein the cover and/or covers have spacing to support:
    1. 5 one inch net pots for growing five plants individually in growing media
    2. 5 one and a half inch net pots for growing five plants individually in growing media
    3. 5 two inch net pots for growing 5 plants individually in growing media
    4. 5 two and a half inch net pots for growing five plants individually in growing media
    5. 5 three inch net pots for growing 5 plants individually in growing media
    6. 4 one inch net pots for growing 4 plants individually in growing media
    7. 4 one and a half inch net pots for growing 4 plants individually in growing media
    8. 4 two inch net pots for growing 4 plants individually in growing media
    9. 4 two and a half inch net pots for growing 4 plants individually in growing media
    10. 4 three inch net pots for growing 4 plants individually in growing media
    11. 4 three and a half inch net pots for growing 4 plants individually in growing media
    12. 3 one inch net pots for growing 3 plants individually in growing media
    13. 3 two inch net pots for growing 3 plants individually in growing media
    14. 3 two and a half inch net pots for growing 3 plants individually in growing media
    15. 3 three inch net pots for growing 3 plants individually in growing media
    16. 3 three and a half inch net pots for growing 3 plants individually in growing media
    17. 2 one inch net pots for growing 2 plants individually in growing media
    18. 2 two inch net pots for growing 2 plants individually in growing media
    19. 2 two and a half inch net pots for growing two plants individually in growing media
    20. 2 three inch net pots for growing 2 plants individually in growing media
    21. 2 three and a half inch net pots for growing 2 plants individually in growing media
    22. 1 one inch net pot for growing one plant individually in growing media
    23. 1 one and a half inch net pot for growing one plant individually in growing media
    24. 1 two inch net pot for growing one plant individually in growing media
    25. 1 two and a half inch net pots for growing one plant individually in growing media
    26. 1 three inch net pots for growing one plant individually in growing media
    27. 1 three and a half inch net pot for growing one plant individually in growing media
    28. a one inch by four inch rectangular bed supporting the growth of multiple plants within one growing media
    29. a one inch by five inch rectangular bed supporting the growth of multiple plants within one growing media
    30. a one inch by six inch rectangular bed supporting the growth of multiple plants within one growing media
    31. a one inch by seven inch rectangular bed supporting the growth of multiple plants within one growing media
    32. a one inch by eight inch rectangular bed supporting the growth of multiple plants within one growing media
    33. a one inch by nine inch rectangular bed supporting the growth of multiple plants within one growing media
    34. a one inch by ten inch rectangular bed supporting the growth of multiple plants within one growing media
    35. a two inch by four inch rectangular bed supporting the growth of multiple plants within one growing media
    36. a two inch by five inch rectangular bed supporting the growth of multiple plants within one growing media
    37. a two inch by six inch rectangular bed supporting the growth of multiple plants within one growing media
    38. a two inch by seven inch rectangular bed supporting the growth of multiple plants within one growing media
    39. a two inch by eight inch rectangular bed supporting the growth of multiple plants within one growing media
    40. a two inch by nine inch rectangular bed supporting the growth of multiple plants within one growing media
    41. a two inch by ten inch rectangular bed supporting the growth of multiple plants within one growing media
    42. a three inch by four inch rectangular bed supporting the growth of multiple plants within one growing media 43. a three inch by five inch rectangular bed supporting the growth of multiple plants within one growing media
44. a three inch by six inch rectangular bed supporting the growth of multiple plants within one growing media
45. a three inch by seven inch rectangular bed supporting the growth of multiple plants within one growing media
46. a three inch by eight inch rectangular bed supporting the growth of multiple plants within one growing media
47. a three inch by nine inch rectangular bed supporting the growth of multiple plants within one growing media
48. a three inch by ten inch rectangular bed supporting the growth of multiple plants within one growing media
49. a four inch by four inch rectangular bed supporting the growth of multiple plants within one growing media
50. a four inch by five inch rectangular bed supporting the growth of multiple plants within one growing media
51. a four inch by six inch rectangular bed supporting the growth of multiple plants within one growing media
52. a four inch by seven inch rectangular bed supporting the growth of multiple plants within one growing media
53. a four inch by eight inch rectangular bed supporting the growth of multiple plants within one growing media
54. a four inch by nine inch rectangular bed supporting the growth of multiple plants within one growing media
55. a four inch by ten inch rectangular bed supporting the growth of multiple plants within one growing media
56. a five inch by four inch rectangular bed supporting the growth of multiple plants within one growing media
57. a five inch by five inch rectangular bed supporting the growth of multiple plants within one growing media
58. a five inch by six inch rectangular bed supporting the growth of multiple plants within one growing media
59. a five inch by seven inch rectangular bed supporting the growth of multiple plants within one growing media
60. a five inch by eight inch rectangular bed supporting the growth of multiple plants within one growing media
61. a five inch by nine inch rectangular bed supporting the growth of multiple plants within one growing media
62. a five inch by ten inch rectangular bed supporting the growth of multiple plants within one growing media
63. a six inch by four inch rectangular bed supporting the growth of multiple plants within one growing media
64. a six inch by five inch rectangular bed supporting the growth of multiple plants within one growing media
65. a six inch by six inch rectangular bed supporting the growth of multiple plants within one growing media
66. a six inch by seven inch rectangular bed supporting the growth of multiple plants within one growing media
67. a six inch by eight inch rectangular bed supporting the growth of multiple plants within one growing media
68. a six inch by nine inch rectangular bed supporting the growth of multiple plants within one growing media
69. a six inch by ten inch rectangular bed supporting the growth of multiple plants within one growing media
70. a seven by four inch rectangular bed supporting the growth of multiple plants within one growing media
71. a seven inch by five inch rectangular bed supporting the growth of multiple plants within one growing media
72. a seven inch by six inch rectangular bed supporting the growth of multiple plants within one growing media
73. a seven inch by seven inch rectangular bed supporting the growth of multiple plants within one growing media
74. a seven inch by eight inch rectangular bed supporting the growth of multiple plants within one growing media
75. a seven inch by nine inch rectangular bed supporting the growth of multiple plants within one growing media
76. a seven inch by ten inch rectangular bed supporting the growth of multiple plants within one growing media
77. a eight by four inch rectangular bed supporting the growth of multiple plants within one growing media
78. a eight inch by five inch rectangular bed supporting the growth of multiple plants within one growing media
79. a eight inch by six inch rectangular bed supporting the growth of multiple plants within one growing media
80. a eight inch by seven inch rectangular bed supporting the growth of multiple plants within one growing media
81. a eight inch by eight inch rectangular bed supporting the growth of multiple plants within one growing media
82. a eight inch by nine inch rectangular bed supporting the growth of multiple plants within one growing media
83. a eight inch by ten inch rectangular bed supporting the growth of multiple plants within one growing media
84. a 9.8 inch by 7.3 inch by 1.5 inch rectangular bed supporting the growth of multiple plants within one growing media
85. 2 one inch by eight inch rectangular beds supporting the growth of multiple plants within one growing media
86. 2 one and a half inch by eight inch rectangular beds supporting the growth of multiple plants within one growing media 87. 2 two inch by eight inch rectangular beds supporting the growth of multiple plants within one growing media
88. 3 two inch by eight inch rectangular beds supporting the growth of multiple plants within one growing media
89. 3 two and a half inch by eight inch rectangular beds supporting the growth of multiple plants within one growing media
90. 3 one inch by eight inch rectangular beds supporting the growth of multiple plants within one growing media
91. 3 one and half inch by eight inch rectangular beds supporting the growth of multiple plants within one growing media
92. 6 one inch by eight inch rectangular beds supporting the growth of multiple plants within one growing media
93. and/or any combinations of width, length and configuration that fits within the dimensions of the hydroponic bed supporting the growth of multiple plants within one growing media
vi. wherein the tray that fits into the cover has a depth of:
1. one inch
2. one and a half inches
3. two inches
4. two and a half inches
5. three inches In one embodiment the natural sunlight provides the light to grow the plants In one embodiment of the invention described herein, lighting is added for growing the plants, wherein the lighting:
g. is positioned on the invention with:
i. a clip and/or snap on telescoping support structure enabling the user to change the height of the light which attaches to:
1. the fish tank
2. the plant growing bed
3. the covers
4. and/or any combination thereof
ii. the ceiling directly above the invention
iii. secured onto a support cover that attaches to a stand for the tank
iv. a support structure that clamps onto the tank
v. a support structure that clamps onto to the plant growing bed
vi. and/or any combination thereof
h. is comprised:
i. a Light Emitting Diode
ii. a power compact fluorescence
iii. a metal halide
iv. a high pressure sodium
v. a plasma lighting
vi. organic light emitting diodes
vii. a high intensity discharge light
viii. and/or any combination thereof In one embodiment of the invention described herein, a light is added for illuminating the fish tank, wherein the lighting:
ix. The light is positioned:
1. on to the top lip of the tank below the plant growing bed with a clip secured to the tank
2. below the plant growing bed via a clip secured to the hydroponic bed
3. situated in an area where the light snaps into the bottom of the plant growing bed wherein:
a. the hydroponic bed is constructed to allow a light to attach and/or snap into position in the bottom of the plant grow bed wherein:
i. the light is be secured in the center of the plant growing bed
ii. the light is be secured in multiple locations on the bottom of the plant growing bed as to illuminate the fish tank accordingly
4. a support structure that clamps onto the tank,
5. a support structure that clamps onto the plant growing bed
6. and/or any combination thereof
x. The light is comprised of one and or any combination of the following:
1. a Light Emitting Diode
2. a submersible light emitting diode
3. a power compact fluorescence
4. a metal halide
5. a high pressure sodium
6. a plasma lighting
7. organic light emitting diodes
8. a high intensity discharge light
9. and/or any combination thereof In one embodiment described in the present invention, the plant growing media is comprised of:
i. coco coir
j. coco fibers
k. rockwool
l. hydroton
m. clay pellets
n. zeolite
o. Limestone
p. dolomite
q. perlite
r. soil
s. peat
t. cotton
u. earthstone
v. and/or any material plant growing materials commonly utilized in the hydroponic and aquaponics industries
w. And/or any combination thereof In one embodiment the cover pieces comprise three or more are interchangeable pieces enabling the operator to grow different plants in different media and planting schemes comprising:
x. of one solid cover with five spaces strategically located to support five plants
y. two separate cover pieces wherein one piece is comprised of three circular spaces to support the growth of three plants, and the second piece is comprised of a rectangular container to support the growth of plants grown in the same media with no individual separation
z. is comprised of three separate cover pieces wherein one piece is comprised of one circular space to support the growth of one plant, and the second and third pieces are comprised of a rectangular container to support the growth of plants grown in the same media with no individual separation
aa. is comprised of three separate cover pieces wherein the first piece has one circular space, the second cover piece has two circular spaces, and the third piece holds one rectangular hydroponic growing container to support the growth of plants grown in the same media with no individual separation bb. and/or any combination thereof In one embodiment of the present invention the fish tank may be any type of container that holds liquid to support hydroponic plant growth utilizing the cover scheme and/or schemes described in claim 1.f and claim 6.

In one embodiment of the present invention the mechanical filter media is removed periodically and added to a soil garden and/or potted plant, and another piece of mechanical filter media is replaced in the filter box In one embodiment of the present invention any type of agricultural and/or hydroponic plants used for medicinal and/or culinary purposes are grown:

cc. off of the filtered fish effluent dd. off of the filtered fish effluent and additional supplements ee. off of a hydroponic solution with fish effluent ff. off of a hydroponic solution gg. and/or any combination thereof In one embodiment the invention is placed outside and/or in a greenhouse.

In one embodiment the invention is placed inside a temperature controlled room.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. An aquaponics aquarium system comprising:
   an aquarium tank having a pump; and
   a removable hydroponic growing bed, wherein the removeable hydroponic growing bed comprises a removeable filter box, a removeable lid for housing plants, a depression, a connection for directing water from the pump into the removeable filter box, a spillway for the water to flow back into the aquarium tank, wherein the removable hydroponic growing bed slides forward to allow access to the aquarium tank, wherein the depression is in a central portion of the removeable hydroponic growing bed such that the depression stops the sliding movement and prevents the removeable hydroponic growing bed from tipping off the aquarium tank.

2. The aquaponics aquarium system of claim 1, wherein the removeable filter box comprises a mechanical filter media residing on top of a biological filter media for removing solids and converting nitrogenous wastes in the water excreted by fish into nitrate, wherein the removeable filter box has apertures on a bottom surface to allow the water to pass through into the removeable hydroponic growing bed.

3. The aquaponics aquarium system of claim 1, wherein the removable lid comprises at least two openings.

4. The aquaponics aquarium system of claim 3, wherein the at least two openings hold net pots.

5. The aquaponics system of claim 3, wherein the at least two openings hold trays.

6. The aquaponics aquarium system of claim 1, wherein the removeable lid is a first removeable lid and further comprising a second removable lid, wherein the first removable lid is interchangeable with the second removable lid having a different number of openings than the first removeable lid.

7. The aquaponics aquarium of claim 1, wherein the removeable filter box is located within the depression.

* * * * *